(12) United States Patent
Mizoguchi (10) Patent No.: US 6,366,977 B1
(45) Date of Patent: *Apr. 2, 2002

(54) SEMICONDUCTOR STORAGE DEVICE EMPLOYING CLUSTER UNIT DATA TRANSFER SCHEME AND DATA MANAGEMENT METHOD THEREOF

(75) Inventor: Shinichi Mizoguchi, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,060

(22) Filed: Mar. 27, 1998

(30) Foreign Application Priority Data

Sep. 9, 1997 (JP) ................................ 9-244002

(51) Int. Cl.[7] .......................... G06F 12/00; G06F 13/00; G06F 3/00
(52) U.S. Cl. ............................ 711/103; 710/33; 710/52
(58) Field of Search .......................... 711/103; 707/205; 710/33, 34, 3, 5, 52

(56) References Cited

U.S. PATENT DOCUMENTS 5,644,787 A * 7/1997 Nakamura et al. ............ 710/33
5,832,525 A * 11/1998 Wong et al. ................. 707/205
5,946,714 A * 8/1999 Miyauchi ..................... 711/205

OTHER PUBLICATIONS

Tabak, Advanced Microprocessors, Dec. 1995, McGraw–Hill, Inc., 2nd edition, pp. 64–65.*
Hennessy & Patterson, Computer Architecture A Quantitative Approach, Dec. 1990, Morgan–Kaufman Publishers, p. 435.*

* cited by examiner

Primary Examiner—Do Hyun Yoo
Assistant Examiner—Kimberly McLean
(74) Attorney, Agent, or Firm—McDermott, Will & Emery (57) ABSTRACT

A semiconductor storage device for reducing data transmission overhead and thereby reducing a drop in the data transmission rate is provided, together with a data management method therefor. A memory unit for sending data in cluster units is achieved with AND-type flash memory, and data transfers between the memory unit and a buffer unit used as cache memory are accomplished in cluster units.

8 Claims, 11 Drawing Sheets

SEMICONDUCTOR STORAGE DEVICE EMPLOYING CLUSTER UNIT DATA TRANSFER SCHEME AND DATA MANAGEMENT METHOD THEREOF

BACKGROUND OF THE INVENTION

1. Field of the Invention

The present invention relates to a semiconductor storage device using nonvolatile semiconductor memory such as flash memory, and to a data management method therefor.

2. Description of the Related Art

Figure 15:
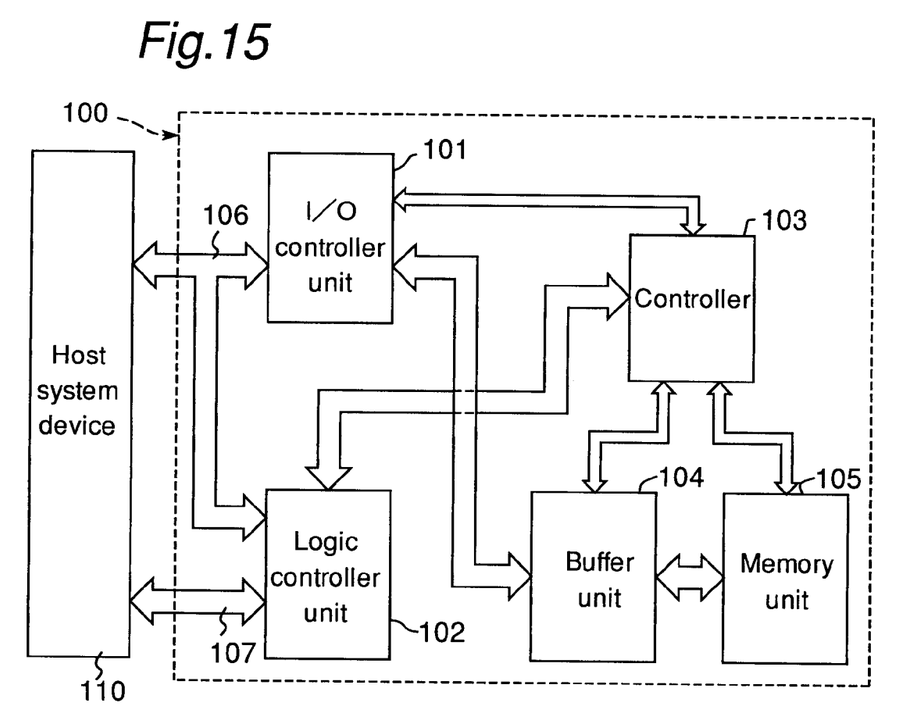
FIG. 15 is a block diagram of a conventional semiconductor storage device using flash memory.

Flash memory is one type of conventional nonvolatile semiconductor memory, and one type of flash memory transfers data in sector units. FIG. 15 is a block diagram of a conventional semiconductor storage device that uses this type of flash memory. As shown in FIG. 15, this semiconductor storage device 100 comprises an input/output controller 101, a logic control unit 102, controller 103, a buffer unit 104 comprising SRAM or other volatile memory, and a memory unit 105 comprising flash memory or other nonvolatile memory.

The input/output controller 101 interfaces with the host system device 110, an information processing device of some kind, through an input/output bus 106. The logic control unit 102 interfaces the host system device 110 using the input/output bus 106 and control bus 107. The controller 103 controls the input/output controller 101, logic control unit 102, buffer unit 104, and memory unit 105 according to commands received from the host system device 110. The input/output bus 106 is used as both an address bus and a data bus. The control bus 107 comprises a plurality of signal lines used by the host system device 110 for supplying various signals to the logic control unit 102, and a signal line for supplying a device status signal from the semiconductor storage device 100 to the host system device 110.

Thus comprised, the input/output controller 101 passes commands received from the host system device 110 via the input/output bus 106 to the controller 103, and passes data likewise received from the host system device 110 via the input/output bus 106 to the buffer unit 104. The logic control unit 102 passes address data received via the input/output bus 106, and control signals received via the control bus 107 to the controller 103, and passes a signal indicative of a device state from the controller 103 to the host system device 110 via the control bus 107.

The controller 103 controls the memory unit 105 according to such control data as address data and commands from the host system device 110 instructing a data read or write operation using the memory unit 105.

While the flash memory used for the memory unit 105 can only read or write data in units of 8 bits or 16 bits, data is exchanged with the host system device 110 in 512-byte units. The controller 103 must therefore use a buffer unit 104 for cache memory.

When the memory unit 105 is AND-type flash memory and data is transferred with the host system device 110 in large sector units in this type of conventional semiconductor storage device, the sector size imposes a minimum overhead requirement for data transfers. More specifically, the need to read and write data between the buffer unit 104 and memory unit 105 in sector units reduces the effective data transfer rate in a system using this semiconductor storage device 100.

SUMMARY OF THE INVENTION

An object of the present invention is therefore to provide a semiconductor storage device for reducing data transmission overhead, and thereby reduce a drop in the data transmission rate, as a means of resolving the above problem.

A further object of the present invention is to provide a data management method using a semiconductor storage device according to the present invention.

To achieve the above objects, a semiconductor storage device that uses nonvolatile memory and is used in a host system device such as an information processing device, comprises according to the present invention an interface for interfacing with a host system device; a memory unit comprising a plurality of nonvolatile memory areas enabling cluster unit data transfer; a buffer unit comprising volatile memory used as cache memory for data transfer between a host system device and memory unit by means of an interface; and a controller for controlling the memory unit and buffer unit according to commands from a host system device wherein the controller accesses and uses the buffer unit using a sector address format corresponding to one cluster of the memory unit.

Thus comprised, the memory unit of a semiconductor storage device according to the present invention can transfer data in cluster units, and data can be transferred between the memory unit and buffer unit, which is used as cache memory, in cluster units. Data transfer overhead is thus reduced, and the resulting drop in the data transfer rate is reduced, when compared with sector unit data transfers.

A semiconductor storage device of the invention can be further comprised such that when particular data is read from a memory unit, the memory unit cluster to which the particular data is stored is read into the buffer unit, and the particular data is then read from the buffer unit for transfer to a host system device. Thus comprised, the overhead of data read operations is reduced, and the resulting drop in the data read rate is reduced, when compared with reading data by sector unit.

A semiconductor storage device of the invention can be further comprised such that when data is written to an empty area of a memory unit, data input from a host system device is stored to an address in a buffer unit corresponding to an address specified by a host system device, and a cluster thus formed in the buffer unit is then read and stored to a cluster in the memory unit specified by the host system device. Thus comprised, the overhead of data write operations is also reduced, and the resulting drop in the data write rate is reduced, when compared with writing data by sector unit.

A semiconductor storage device of the invention can be further comprised such that when data stored to a memory unit is rewritten, a cluster of the memory unit to which particular is to be overwritten is read and stored to the buffer unit, the memory unit cluster is erased, data in the cluster stored to the buffer unit corresponding to a memory unit address specified by the host system device is overwritten with data input from the host system device, and a cluster thus formed in the buffer unit is then read and stored to the erased cluster of the memory unit. Thus comprised, the overhead of data rewrite operations is also reduced, and the resulting drop in the data rewrite rate is reduced, when compared with rewriting data by sector unit.

The capacity of the buffer unit in a semiconductor storage device according to the present invention is preferably equivalent to one cluster of the memory unit. This enables the same logic structure of sectors and sector management areas to be used in the buffer unit as in the clusters of the memory unit, and thus makes cluster unit data transfers between the buffer unit and memory unit simple.

Furthermore, the memory unit is preferably AND-type flash memory. As described above, this enables cluster unit data transfers, and reduces the data transfer overhead and the resulting drop in the data transfer rate when compared with sector unit data transfers.

A data management method for a semiconductor storage device used in a host system device such as an information processing device and comprising a memory unit having a plurality of nonvolatile memory areas enabling cluster unit data transfer, and a buffer unit having volatile memory used as cache memory, comprises the following steps for reading data from the memory unit: reading a cluster of the memory unit storing data at an address specified by a host system device, storing a cluster read from the memory unit to the buffer unit, and reading data from a buffer unit address specified by a host system device for output to a host system device.

Other objects and attainments together with a fuller understanding of the invention will become apparent and appreciated by referring to the following description and claims taken in conjunction with the accompanying drawings.

BRIEF DESCRIPTION OF THE DRAWINGS

These and other objects and features of the present invention will become clear from the following description taken in conjunction with the preferred embodiment thereof and the accompanying drawings throughout which like parts are designated by like reference numerals, and in which.

DETAILED DESCRIPTION OF THE PREFERRED EMBODIMENT

Figure 1:
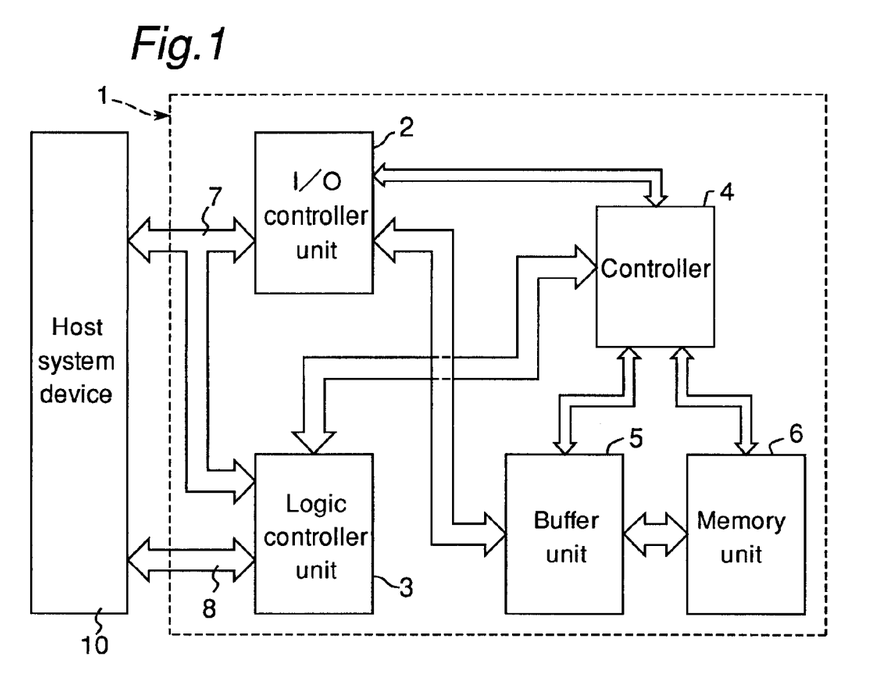
FIG. 1 is a block diagram of a semiconductor storage device according to a preferred embodiment of the present invention.

The preferred embodiments of the present invention are described below with reference to the accompanying figures, of which FIG. 1 is a block diagram of a semiconductor storage device according to a preferred embodiment of the present invention. As shown in FIG. 1, a semiconductor storage device 1 according to the present invention comprises an input/output controller 2, a logic control unit 3, controller 4, a buffer unit 5 comprising SRAM or other volatile memory, and a memory unit 6 comprising flash memory or other nonvolatile memory. The input/output controller 2 and logic control unit 3 function as interfaces with a host system device 10.

The input/output controller 2 is thus connected to a host system device 10, an information processing device of some kind, through an input/output bus 7. The logic control unit 3 is likewise connected to the host system device 10 through a control bus 8. The input/output controller 2 is further connected to the controller 4 and buffer unit 5, and the logic control unit 3 is also connected to the controller 4. The controller 4 is connected to the buffer unit 5 and memory unit 6. The buffer unit 5 and memory unit 6 are also mutually connected.

The input/output controller 2 interfaces with the host system device 10 via the input/output bus 7, and the logic control unit 3 interfaces with the host system device 10 using the input/output bus 7 and control bus 8. The controller 4 controls the input/output controller 2, logic control unit 3, buffer unit 5, and memory unit 6 according to commands from the host system device 10.

The input/output bus 7 is used as both an address bus and data bus. The control bus 8 comprises signal lines through which various control signals are supplied from the host system device 10, and a signal line for sending status detection signal READY from the semiconductor storage device 1 to the host system device 10. Note that these control signals include, for example, a chip selection signal CS#, output enable signal OE#, write enable signal WE#, reset signal RES, and a clock pulse signal CLK. The status detection signal READY declares whether or not the semiconductor storage device 1 is ready. Note that the suffix "#" to particular control signals above indicates an inverted signal level, that is, the signals are active low.

The input/output controller 2 passes commands from the host system device 10 asserted via the input/output bus 7 to the controller 4, and passes data to be stored to the memory unit 6 to the buffer unit 5. Data read from the memory unit 6 by way of the buffer unit 5 is passed over the input/output bus 7 to the host system device 10.

The logic control unit 3 transfers address data input by way of the input/output bus 7, and control signals input by way of the control bus 8 to the controller 4, and passes the device status signal supplied from the controller 4 to the host system device 10 via the control bus 8.

The controller 4 controls the memory unit 6 according to the address data and other control signals from the host system device 10, including commands to read or write the memory unit 6. While the flash memory used for the memory unit 6 can only read or write data in units of 8 bits or 16 bits, data is exchanged with the host system device 10 in 512-byte units. The controller 4 must therefore use a buffer unit 5 for cache memory.

The memory unit 6 is AND-type flash memory capable of transferring data in cluster units. The capacity of the buffer unit 5 is therefore sufficient to store one cluster, and is formatted by the controller 4 with a plurality of sectors and sector management areas in a configuration identical to a cluster of the memory unit 6.

Figure 2:
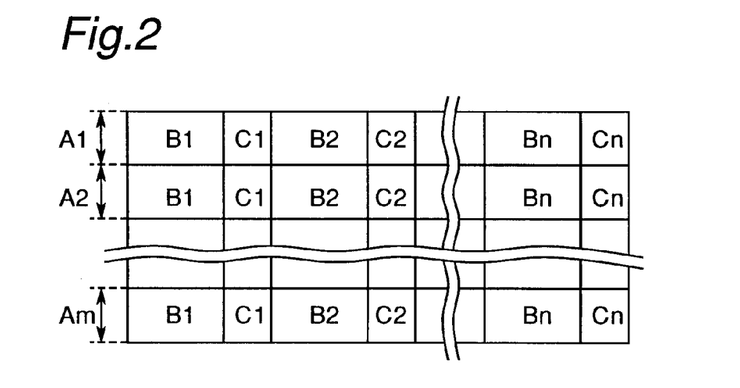
FIG. 2 is a map of the memory space in the memory unit shown in FIG. 1.

FIG. 2 is a map of the memory space in memory unit 6. As shown in FIG. 2, the memory unit 6 comprises a plurality of clusters A1 to Am, where m is a natural number and addresses are assigned by cluster. Each cluster A1 to Am comprises a plurality of sectors B1 to Bn, where n is a natural number, each with a corresponding sector management area C1 to Cn. The sector management areas C1 to Cn store information relating to the corresponding sectors B1 to Bn, and follow the end of the corresponding sector. The controller 4 therefore uses the buffer unit 5 with the same configuration of sectors B1 to Bn and corresponding sector management areas C1 to Cn as in the clusters A1 to Am of the memory unit 6.

It should be noted that the address data supplied from the host system device 10 expresses the address of sectors B1 to Bn as a particular offset, for example, 3 or 4 bits, from the lowest address. The controller 4 can thus perform read, write, and erase operations by accessing the cluster address of the memory unit 6 expressed by the address data input from the host system device 10 in response to the appropriate commands received from the host system device 10.

The method whereby a semiconductor storage device 1 thus comprised reads data stored to the memory unit 6 is described next below.

Figure 3:
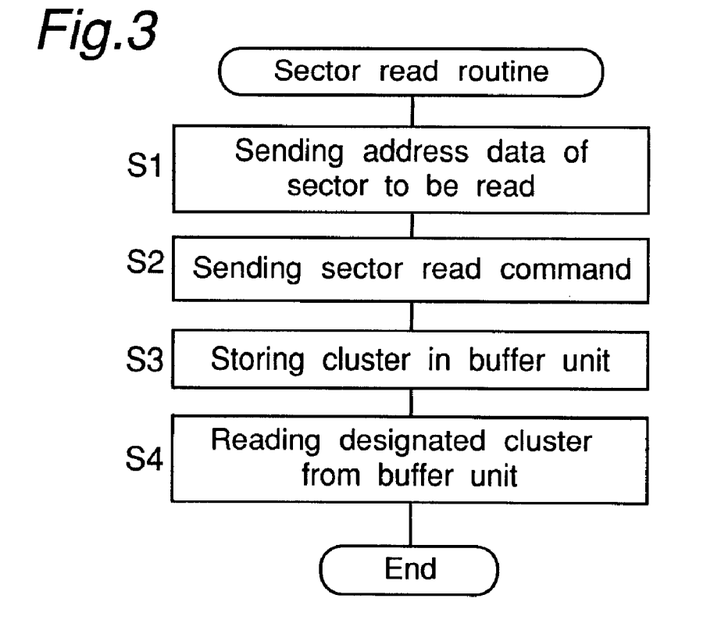
FIG. 3 is a flow chart used to describe the operation for reading data from a sector in the semiconductor storage device shown in FIG. 1.

FIG. 3 is a flow chart used to describe a sector read routine whereby a sector, including the corresponding sector management area, specified by the host system device 10 is read in the semiconductor storage device shown in FIG. 1.

In the first step S1 in this routine, the host system device 10 sends address data indicative of the sector to be read across the input/output bus 7 to the logic control unit 3. The logic control unit 3 then forwards the address data to the controller 4.

At step S2, the host system device 10 sends a particular sector read command for reading a particular sector and corresponding sector management area over the input/output bus 7 to the input/output controller 2, and sends the control signals over the control bus 8 to the logic control unit 3. The input/output controller 2 then sends the received sector read command to the controller 4, and the logic control unit 3 sends the received control signals to the controller 4.

At step S3, the controller 4 recognizes the command supplied from the input/output controller 2 to be a sector read command, and reads the cluster containing the sector specified by the host system device 10 from the memory unit 6 to the buffer unit 5.

At step S4, the controller 4 reads the particular sector and corresponding sector management area specified by the host system device 10 from the cluster stored to the buffer unit 5, and then sends the read information through the input/output controller 2 and input/output bus 7 to the host system device 10 before terminating the sector read routine.

It should be noted that a specified sector and corresponding sector management area are both read by the read routine shown in FIG. 3. However, when the sector read command from the host system device 10 does not include a sector management area, only the sector specified by the host system device 10 is read in step S4 in FIG. 3.

Figure 4:
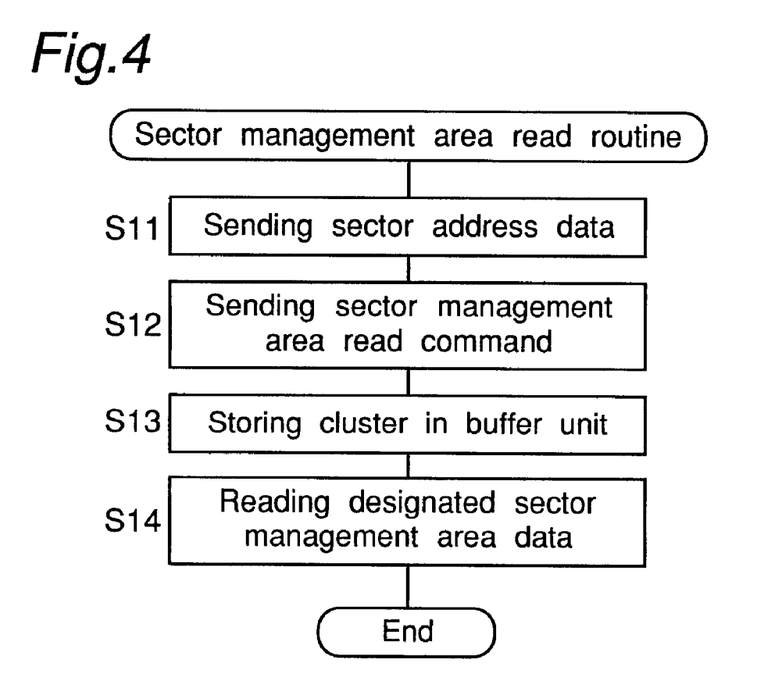
FIG. 4 is a flow chart used to describe the operation for reading data from a sector management area in the semiconductor storage device shown in FIG. 1.

FIG. 4 is a flow chart used to describe a sector management area read routine whereby a particular sector management area is read in the semiconductor storage device shown in FIG. 1.

In the first step S11 in this routine, the host system device 10 sends address data indicative of the sector associated with the sector management area to be read across the input/output bus 7 to the logic control unit 3. The logic control unit 3 then forwards the address data to the controller 4.

At step S12, the host system device 10 sends a particular sector management area read command for reading a particular sector management area over the input/output bus 7 to the input/output controller 2, and sends the control signals over the control bus 8 to the logic control unit 3. The input/output controller 2 then sends the received sector management area read command to the controller 4, and the logic control unit 3 sends the received control signals to the controller 4.

At step S13, the controller 4 recognizes the command supplied from the input/output controller 2 to be a sector management area read command, and reads the cluster containing the sector specified by the host system device 10 from the memory unit 6 to the buffer unit 5.

At step S14, the controller 4 reads the particular sector management area specified by the host system device 10 from the cluster stored to the buffer unit 5, and then sends the read information through the input/output controller 2 and input/output bus 7 to the host system device 10 before terminating the sector management area read routine.

Figure 5:
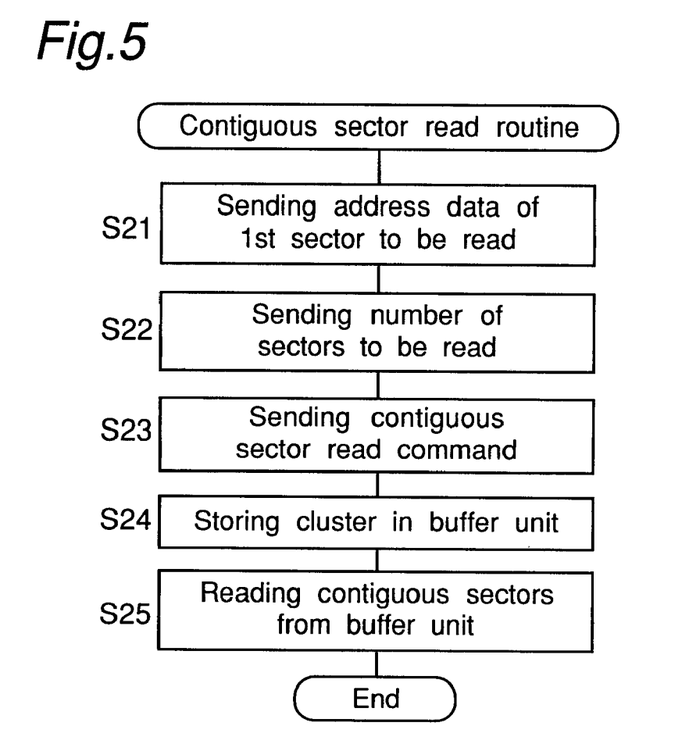
FIG. 5 is a flow chart used to describe the operation for reading data from a plurality of contiguous sectors in a cluster in the semiconductor storage device shown in FIG. 1.

FIG. 5 is a flow chart used to describe a contiguous sector read routine whereby a particular contiguous series of plural sectors and corresponding sector management areas in a particular cluster is read in the semiconductor storage device shown in FIG. 1.

In the first step S21 in this routine, the host system device 10 sends address data indicative of the first of a plurality of contiguous sectors in a cluster to be read across the input/output bus 7 to the logic control unit 3. The logic control unit 3 then forwards the address data to the controller 4.

At step S22, the host system device 10 sends a sector count, that is, the number of sectors to be read, over the input/output bus 7 to the input/output controller 2. The input/output controller 2 outputs this sector count to the controller 4.

At step S23, the host system device 10 sends a specific contiguous sector read command over the input/output bus 7 to the input/output controller 2 to read the series of contiguous sectors and associated sector management areas within a cluster, and sends the control signals over the control bus 8 to the logic control unit 3. The input/output controller 2 then sends the received contiguous sector read command to the controller 4, and the logic control unit 3 sends the received control signals to the controller 4.

At step S24, the controller 4 recognizes the command supplied from the input/output controller 2 to be a contiguous sector read command, and reads the cluster containing the sector specified by the host system device 10 from the memory unit 6 to the buffer unit 5.

At step S25, the controller 4 reads the particular sectors and corresponding sector management areas specified by the address of the first sector and the sector count supplied by the host system device 10 from the cluster stored to the buffer unit 5, and then sends the read information through the input/output controller 2 and input/output bus 7 to the host system device 10 before terminating the routine.

Figure 6:
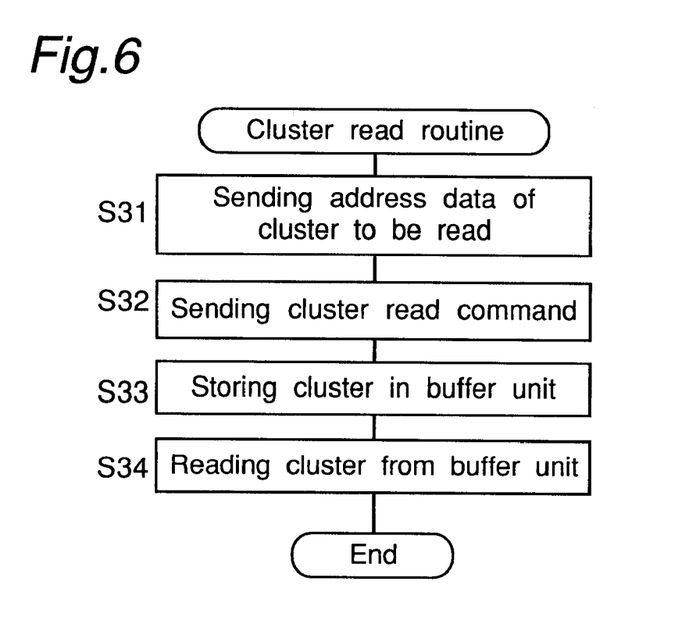
FIG. 6 a flow chart used to describe the operation for reading data from a cluster in the semiconductor storage device shown in FIG. 1.

FIG. 6 is a flow chart used to describe a cluster read routine whereby an entire cluster specified by the host system device 10 is read in the semiconductor storage device shown in FIG. 1.

In the first step S31 in this routine, the host system device 10 sends address data indicative of the cluster to be read across the input/output bus 7 to the logic control unit 3. The logic control unit 3 then forwards the address data to the controller 4.

At step S32, the host system device 10 sends a particular cluster read command for reading a particular cluster over the input/output bus 7 to the input/output controller 2, and sends the control signals over the control bus 8 to the logic control unit 3. The input/output controller 2 then sends the received cluster read command to the controller 4, and the logic control unit 3 sends the received control signals to the controller 4.

At step S33, the controller 4 recognizes the command supplied from the input/output controller 2 to be a cluster read command, and reads the cluster specified by the host system device 10 from the memory unit 6 to the buffer unit 5.

At step S34, the controller 4 reads the particular cluster stored to the buffer unit 5, and then sends the read information through the input/output controller 2 and input/output bus 7 to the host system device 10 before terminating the routine.

Methods of writing data to the memory unit 6 in a semiconductor storage device 1 according to the present invention are described next below.

Figure 7:
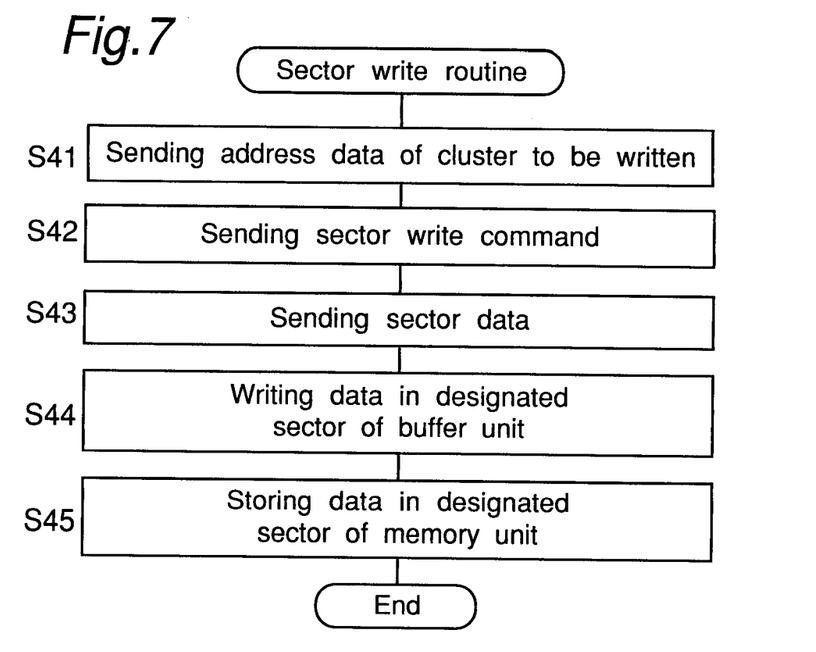
FIG. 7 is a flow chart used to describe the operation for writing data to a sector in the semiconductor storage device shown in FIG. 1.

FIG. 7 is a flow chart used to describe a sector write routine whereby data is written to a particular sector and the corresponding sector management area specified by the host system device 10 in the semiconductor storage device shown in FIG. 1.

In the first step S41 in this routine, the host system device 10 sends address data indicative of the sector to be written across the input/output bus 7 to the logic control unit 3. The logic control unit 3 then forwards the address data to the controller 4. It should be noted that in the present example, the host system device 10 supplies the address data of a sector in a cluster in the memory unit 6 to which data is not written.

At step S42, the host system device 10 sends a particular sector write command for writing data to a particular sector and corresponding sector management area over the input/output bus 7 to the input/output controller 2, and sends the control signals over the control bus 8 to the logic control unit 3. The input/output controller 2 then sends the received sector write command to the controller 4, and the logic control unit 3 sends the received control signals to the controller 4.

At step S43, the controller 4 recognizes the command supplied from the input/output controller 2 to be a sector write command, and the host system device 10 transfers the data to be stored to the specified sector and corresponding sector management area of the memory unit 6 to the input/output controller 2 by way of the input/output bus 7.

At step S44, the input/output controller 2 passes the received data to the buffer unit 5. The controller 4 then stores the data passed from the input/output controller 2 to the specified sector and corresponding sector management area of the buffer unit 5 based on the buffer unit address data received in step S41.

At step S45, the controller 4 reads the data cluster stored to the buffer unit 5 and writes the data to the cluster specified by the host system device 10 in the memory unit 6 before terminating the routine.

It should be noted that a specified sector and corresponding sector management area are both written by the write routine shown in FIG. 7. However, when the sector write command from the host system device 10 does not include a sector management area, only the sector of the buffer unit 5 specified by the host system device 10 is written in FIG. 7.

Figure 8:
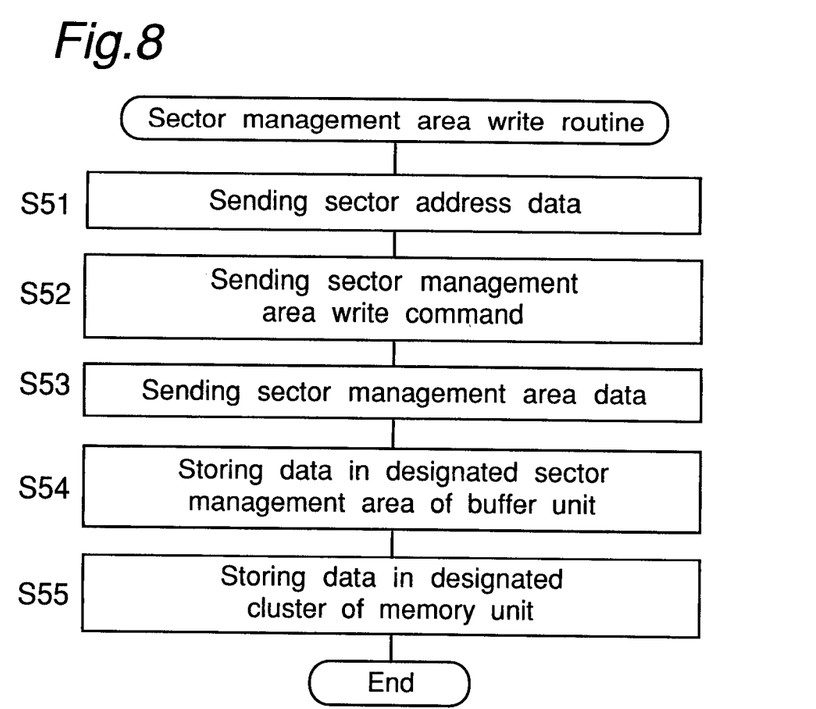
FIG. 8 is a flow chart used to describe the operation for writing data to a sector management area in the semiconductor storage device shown in FIG. 1.

FIG. 8 is a flow chart used to describe a sector management area write routine whereby data is written to a sector management area specified by the host system device 10 in the semiconductor storage device shown in FIG. 1.

In the first step S51 in this routine, the host system device 10 sends address data indicative of the sector associated with the sector management area to be written across the input/output bus 7 to the logic control unit 3. The logic control unit 3 then forwards the address data to the controller 4. It should be noted that in the present example, the host system device 10 supplies the address data of a sector in a cluster in the memory unit 6 to which data is not written.

At step S52, the host system device 10 sends a particular sector management area write command for writing data to a particular sector management area over the input/output bus 7 to the input/output controller 2, and sends the control signals over the control bus 8 to the logic control unit 3. The input/output controller 2 then sends the received sector management area write command to the controller 4, and the logic control unit 3 sends the received control signals to the controller 4.

At step S53, the controller 4 recognizes the command supplied from the input/output controller 2 to be a sector management area write command, and the host system device 10 transfers the data to be stored to the specified sector management area of the memory unit 6 to the input/output controller 2 by way of the input/output bus 7.

At step S54, the input/output controller 2 passes the received data to the buffer unit 5. The controller 4 then stores the data passed from the input/output controller 2 to the specified sector management area of the buffer unit 5 based on the buffer unit address data received in step S51.

At step S55, the controller 4 reads the data cluster stored to the buffer unit 5 and writes the data to the cluster specified by the host system device 10 in the memory unit 6 before terminating the routine.

Figure 9:
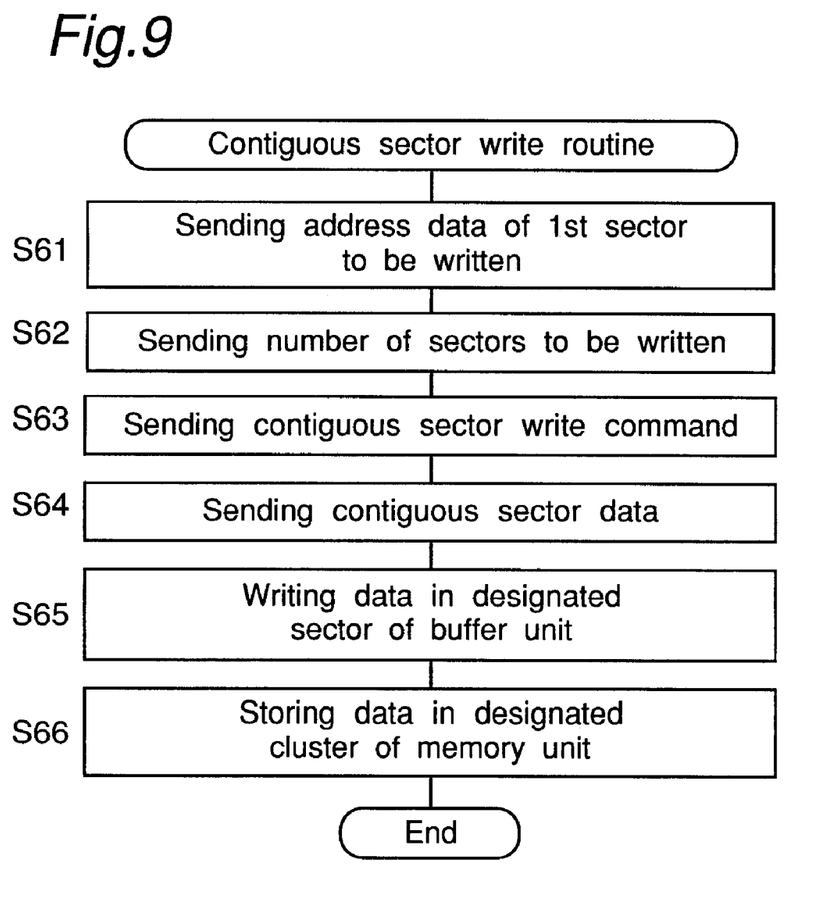
FIG. 9 is a flow chart used to describe the operation for writing data to a plurality of contiguous sectors in a cluster in the semiconductor storage device shown in FIG. 1.

FIG. 9 is a flow chart used to describe a contiguous sector write routine whereby data is written to a particular contiguous series of plural sectors and corresponding sector management areas in a cluster specified by the host system device 10 in the semiconductor storage device shown in FIG. 1.

In the first step S61 in this routine, the host system device 10 sends address data indicative of the first of a plurality of contiguous sectors in a cluster to be written across the input/output bus 7 to the logic control unit 3. The logic control unit 3 then forwards the address data to the controller 4. It should be noted that in the present example, the host system device 10 supplies the address data of a sector in a cluster in the memory unit 6 to which data is not written.

At step S62, the host system device 10 sends a sector count, that is, the number of sectors to be written, over the input/output bus 7 to the input/output controller 2. The input/output controller 2 outputs this sector count to the controller 4.

At step S63, the host system device 10 sends a specific contiguous sector write command over the input/output bus 7 to the input/output controller 2 for writing a series of contiguous sectors and associated sector management areas within a cluster, and sends the control signals over the control bus 8 to the logic control unit 3. The input/output controller 2 then sends the received contiguous sector write command to the controller 4, and the logic control unit 3 sends the received control signals to the controller 4.

At step S64, the controller 4 recognizes the command supplied from the input/output controller 2 to be a contiguous sector write command, and the host system device 10 sends the data to be stored to the specified contiguous sectors and corresponding sector management areas in the memory unit 6 over the input/output bus 7 to the input/output controller 2.

At step S65, the input/output controller 2 passes the input write data to the buffer unit 5. The controller 4 writes the data output from the input/output controller 2 to the appropriate sector or sector management area of the buffer unit 5. The contiguous series of sectors is written at this time by starting from the sector specified by the address data received in step S61 above, and writing sequentially for the sector count specified in step S62 above.

At step S66, the controller 4 reads the data cluster stored to the buffer unit 5 and writes the data to the cluster specified by the host system device 10 in the memory unit 6 before terminating the routine.

Figure 10:
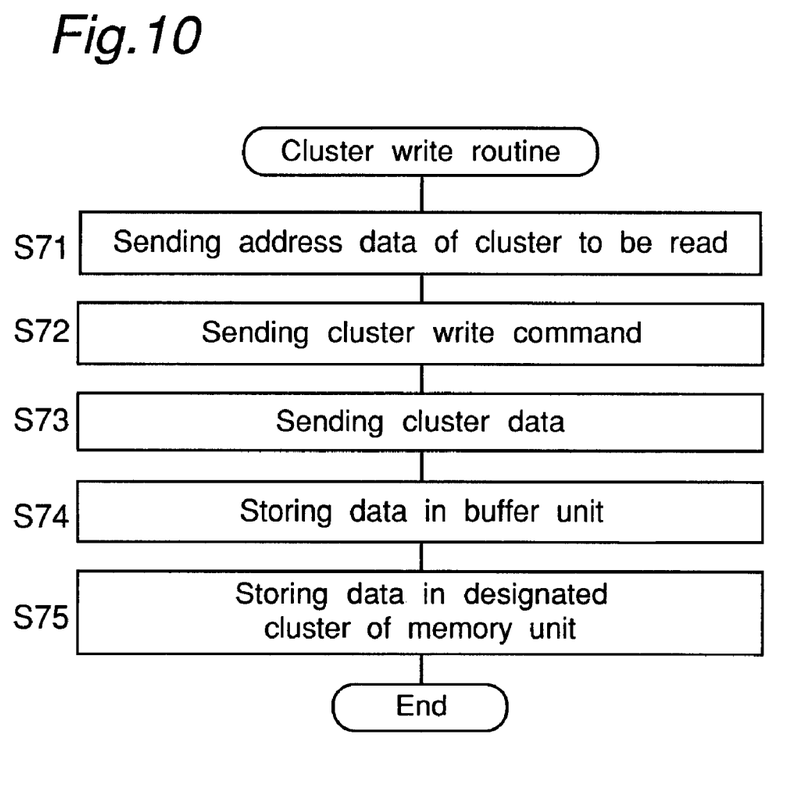
FIG. 10 is a flow chart used to describe the operation for writing data to a cluster in the semiconductor storage device shown in FIG. 1.

FIG. 10 is a flow chart used to describe a cluster write routine whereby an entire cluster specified by the host system device 10 is written in the semiconductor storage device shown in FIG. 1.

In the first step S71 in this routine, the host system device 10 sends address data indicative of the cluster to be written across the input/output bus 7 to the logic control unit 3. The logic control unit 3 then forwards the address data to the controller 4. It should be noted that in the present example, the host system device 10 supplies the address data of a cluster in the memory unit 6 to which data is not written.

At step S72, the host system device 10 sends a particular cluster write command for writing data to a particular cluster over the input/output bus 7 to the input/output controller 2, and sends control signals over the control bus 8 to the logic control unit 3. The input/output controller 2 then sends the received cluster write command to the controller 4, and the logic control unit 3 sends the received control signals to the controller 4.

At step S73, the controller 4 recognizes the command supplied from the input/output controller 2 to be a cluster write command, and the host system device 10 transfers the data to be stored to the specified cluster of the memory unit 6 to the input/output controller 2 by way of the input/output bus 7.

At step S74, the input/output controller 2 passes the received data to the buffer unit 5. The controller 4 then stores the data passed from the input/output controller 2 to the specified cluster of the buffer unit 5.

At step S75, the controller 4 reads the data cluster stored to the buffer unit 5 and writes the data to the cluster specified by the host system device 10 in the memory unit 6 before terminating the routine.

Methods of rewriting data to the memory unit 6 in a semiconductor storage device 1 according to the present invention are described next below.

Figure 11:
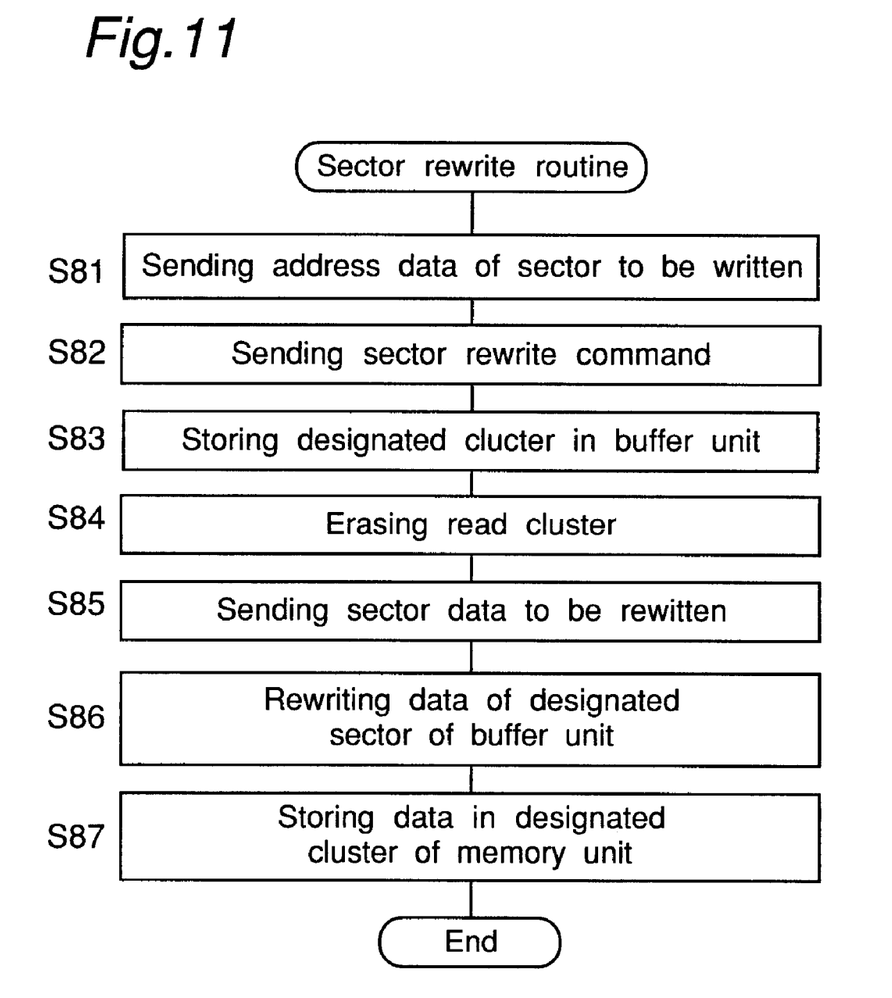
FIG. 11 is a flow chart used to describe the operation for rewriting data in a sector in the semiconductor storage device shown in FIG. 1.

FIG. 11 is a flow chart used to describe a data rewrite routine whereby data written to a particular sector and corresponding sector management area is rewritten in the semiconductor storage device shown in FIG. 1.

In the first step S81 in this routine, the host system device 10 sends address data indicative of the sector to be rewritten across the input/output bus 7 to the logic control unit 3. The logic control unit 3 then forwards the address data to the controller 4.

At step S82, the host system device 10 sends a specified sector rewrite command for rewriting data to a particular sector and corresponding sector management area over the input/output bus 7 to the input/output controller 2, and sends the control signals over the control bus 8 to the logic control unit 3. The input/output controller 2 then sends the received sector rewrite command to the controller 4, and the logic control unit 3 sends the received control signals to the controller 4.

At step S83, the controller 4 recognizes the command supplied from the input/output controller 2 to be a sector rewrite command, and reads the cluster containing the sector specified by the host system device 10 from the memory unit 6 to the buffer unit 5.

At step S84, the controller 4 erases the cluster of the memory unit 6 read to the buffer unit 5.

At step S85, the host system device 10 transfers the data to be overwritten to the specified sector and corresponding sector management area of the memory unit 6 to the input/output controller 2 by way of the input/output bus 7.

At step S86, the input/output controller 2 transfers the received data to the buffer unit 5. The controller 4 then overwrites the sector and corresponding sector management area at the address in the buffer unit 5 specified in step S81 with the data passed from the input/output controller 2 for writing to the specified sector and corresponding sector management area of the buffer unit 5.

At step S87, the controller 4 reads the data cluster rewritten in the buffer unit 5, and rewrites the data to the cluster in the memory unit 6 from which data was previously read before terminating the routine.

It should be noted that a specified sector and corresponding sector management area are both rewritten by the write routine shown in FIG. 11. When the sector rewrite command from the host system device 10 does not include a sector management area, the rewrite operation described above is the same except that only the sector of the buffer unit 5 specified by the host system device 10 is rewritten, and further description thereof is thus omitted below.

Figure 12:
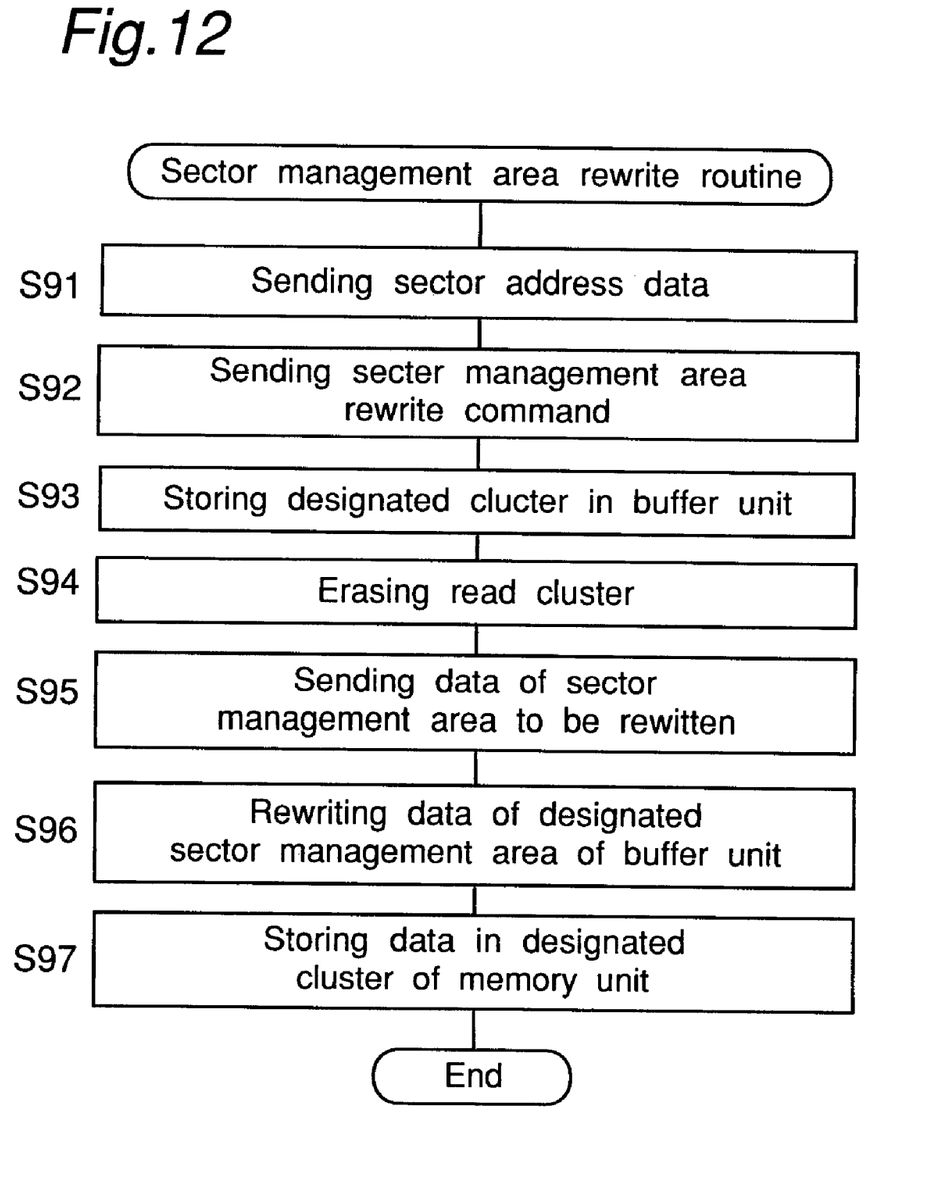
FIG. 12 is a flow chart used to describe the operation for rewriting data in a sector management area in the semiconductor storage device shown in FIG. 1.

FIG. 12 is a flow chart used to describe a data rewrite routine whereby data written to a particular sector management area is rewritten in the semiconductor storage device shown in FIG. 1.

In the first step S91 in this routine, the host system device 10 sends address data indicative of the sector associated with the sector management area to be rewritten across the input/output bus 7 to the logic control unit 3. The logic control unit 3 then forwards the address data to the controller 4.

At step S92, the host system device 10 sends a specified sector management area rewrite command for rewriting data to a particular sector management area over the input/output bus 7 to the input/output controller 2, and sends the control signals over the control bus 8 to the logic control unit 3. The input/output controller 2 then sends the received sector management area rewrite command to the controller 4, and the logic control unit 3 sends the received control signals to the controller 4.

At step S93, the controller 4 recognizes the command supplied from the input/output controller 2 to be a sector management area rewrite command, and reads the cluster containing the sector specified by the host system device 10 from the memory unit 6 to the buffer unit 5.

At step S94, the controller 4 erases the cluster of the memory unit 6 read to the buffer unit 5.

At step S95, the host system device 10 transfers the data to be overwritten to the specified sector management area of the memory unit 6 to the input/output controller 2 by way of the input/output bus 7.

At step S96, the input/output controller 2 transfers the received data to the buffer unit 5. The controller 4 then overwrites the sector management area at the address in the buffer unit 5 specified in step S91 with the data passed from the input/output controller 2 for writing to the specified sector management area of the buffer unit 5.

At step S97, the controller 4 reads the data cluster rewritten in the buffer unit 5, and writes the data to the cluster in the memory unit 6 from which data was previously read before terminating the routine.

Figure 13:
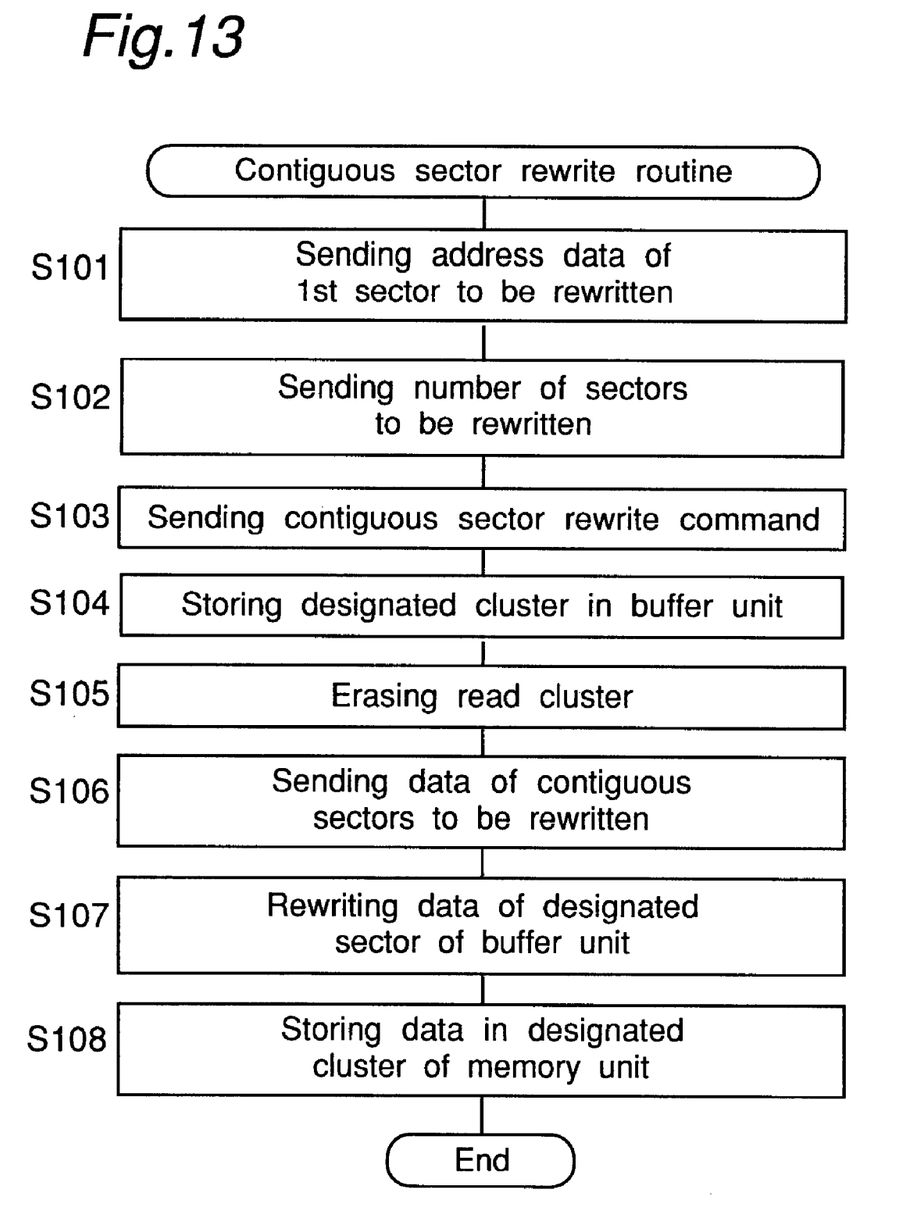
FIG. 13 is a flow chart used to describe the operation for rewriting data in a plurality of contiguous sectors in a cluster in the semiconductor storage device shown in FIG. 1.

FIG. 13 is a flow chart used to describe a contiguous sector rewrite routine whereby data written to a particular contiguous series of plural sectors and corresponding sector management areas in a cluster is rewritten in the semiconductor storage device shown in FIG. 1.

In the first step S101 in this routine, the host system device 10 sends address data indicative of the first of a plurality of contiguous sectors in a cluster to be rewritten across the input/output bus 7 to the logic control unit 3. The logic control unit 3 then forwards the address data to the controller 4.

At step S102, the host system device 10 sends a sector count, that is, the number of sectors to be rewritten, over the input/output bus 7 to the input/output controller 2. The input/output controller 2 passes this sector count to the controller 4.

At step S103, the host system device 10 sends a specified contiguous sector rewrite command over the input/output bus 7 to the input/output controller 2 for rewriting a series of contiguous sectors and associated sector management areas within a cluster, and sends the control signals over the control bus 8 to the logic control unit 3. The input/output controller 2 then sends the received contiguous sector write command to the controller 4, and the logic control unit 3 sends the received control signals to the controller 4.

At step S104, the controller 4 recognizes the command supplied from the input/output controller 2 to be a contiguous sector rewrite command, and reads the cluster containing the sectors specified by the host system device 10 from the memory unit 6 to the buffer unit 5.

At step S105, the controller 4 erases the cluster of the memory unit 6 read to the buffer unit 5.

At step S106, the host system device 10 transfers the data to be overwritten to the specified contiguous sectors and sector management areas of the memory unit 6 to the input/output controller 2 by way of the input/output bus 7.

At step S107, the controller 4 then overwrites the specified contiguous series of sectors of the buffer unit 5 with the desired data output from the input/output controller 2. Data overwriting at this time starts from the sector specified by the address data received in step S101 above, and proceeds sequentially for the sector count specified in step S102 above.

At step S108, the controller 4 reads the data cluster rewritten in the buffer unit 5, and rewrites the data to the cluster in the memory unit 6 from which data was previously read before terminating the routine.

Figure 14:
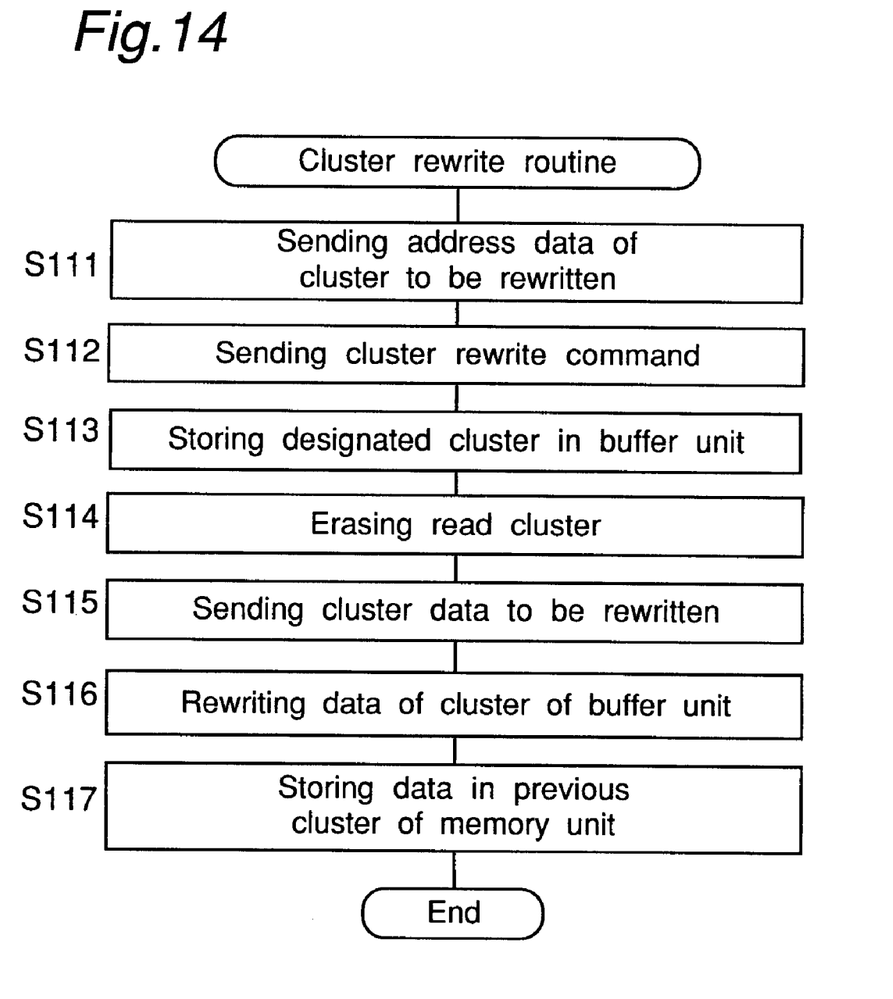
FIG. 14 is a flow chart used to describe the operation for rewriting data in a cluster in the semiconductor storage device shown in FIG. 1.

FIG. 14 is a flow chart used to describe a data rewrite routine whereby data written to a particular cluster is rewritten in the semiconductor storage device shown in FIG. 1.

In the first step S111 in this routine, the host system device 10 sends address data indicative of the cluster to be rewritten across the input/output bus 7 to the logic control unit 3. The logic control unit 3 then forwards the address data to the controller 4.

At step S112, the host system device 10 sends a specified cluster rewrite command for rewriting data to a particular cluster over the input/output bus 7 to the input/output controller 2, and sends the control signals over the control bus 8 to the logic control unit 3. The input/output controller 2 then sends the received cluster rewrite command to the controller 4, and the logic control unit 3 sends the received control signals to the controller 4.

At step S113, the controller 4 recognizes the command supplied from the input/output controller 2 to be a cluster rewrite command, and reads the cluster specified by the host system device 10 from the memory unit 6 to the buffer unit 5.

At step S114, the controller 4 erases the cluster of the memory unit 6 read to the buffer unit 5.

At step S115, the host system device 10 transfers the data to be overwritten to the specified cluster of the memory unit 6 to the input/output controller 2 by way of the input/output bus 7.

At step S116, the input/output controller 2 transfers the received data to the buffer unit 5. The controller 4 then overwrites the cluster at the address in the buffer unit 5 specified in step S111 with the data passed from the input/output controller 2 for writing to the specified cluster of the buffer unit 5.

At step S117, the controller 4 reads the data cluster rewritten in the buffer unit 5, and writes the data to the cluster in the memory unit 6 from which data was previously read before terminating the routine.

As described above, a semiconductor storage device according to a preferred embodiment of the present invention is AND-type flash memory capable of exchanging data in cluster units between a memory unit 6 and a buffer unit 5 used as cache memory. Data transfer overhead is thus reduced compared with a device limited to sector unit data transfers, and a drop in the data transfer rate caused by high overhead can be reduced.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor storage device that uses nonvolatile memory and is used in a host system device such as an information processing device, said semiconductor storage device comprising:

an interface for interfacing with the host system device;

a memory unit comprising a plurality of nonvolatile memory areas that enable data transfer in a unit cluster;

a buffer unit comprising volatile memory used as cache memory for data transfer between the host system device and the memory unit via the interface; and a controller for controlling the memory unit and the buffer unit according to commands from the host system device, wherein the controller accesses and uses the buffer unit using a sector address format corresponding to one cluster of the memory unit, wherein when particular data is read from the memory unit, a cluster of the memory unit to which the particular data is stored is read into the buffer unit, and the particular data is then read from the buffer unit for transfer to the host system device, a capacity of the buffer unit is equivalent to one cluster of the memory unit, and the buffer unit has the sector address format assigned thereto corresponding to one cluster of the memory unit, and the data at a particular sector address designated by the host system device are read from the buffer unit.

2. The semiconductor storage device according to claim 1, wherein when data is written to an empty area of the memory unit, data input from the host system device is stored to an address in the buffer unit corresponding to an address specified by the host system device, and a cluster thus formed in the buffer unit is then read and stored to a cluster in the memory unit specified by the host system.

3. The semiconductor storage device according to claim 1, wherein when data stored to the memory unit is rewritten, a cluster of the memory unit to which particular data is to be overwritten is read and stored to the buffer unit, the memory unit cluster is erased, data in the cluster stored to the buffer unit corresponding to the memory unit address specified by the host system device is overwritten with data input from the host system device, and a cluster thus formed in the buffer unit is then read and stored to the erased cluster of the memory unit.

4. The semiconductor storage device according to claim 1, wherein the memory unit is AND-type flash memory.

5. A data management method for a semiconductor storage device used in a host system device such as an information processing device and comprising a memory unit having a plurality of nonvolatile memory areas enabling transfer in a unit of cluster having a prescribed constant data size, and a buffer unit having a volatile memory used as cache memory which has a memory size necessary for storing data of one cluster, said data management method comprising the following steps for reading data from the memory unit:

designating address data of at least one sector of the memory unit to be read from the host system device to the semiconductor storage device;

specifying a cluster of the memory unit including at least the one sector to be read;

logically allocating sector addresses corresponding to sector addresses of the cluster to the buffer unit;

reading the specified cluster of the memory unit;

storing the cluster read from the memoir unit at the buffer unit in accordance with the allocated sector addresses; and reading data from the buffer unit in accordance with the designated address data.

6. The data management method according to claim 5, further comprising the following steps for writing data to an empty area of a memory unit:

storing data input from the host system device to an address in the buffer unit corresponding to an address specified by the host system device, reading a cluster thus formed in the buffer unit, and storing the read cluster to a cluster in the memory unit specified by the host system device.

7. The data management method according to claim 5, further comprising the following steps for rewriting data stored to a memory unit:

reading a cluster of the memory unit to which particular is to be overwritten, storing the read cluster to the buffer unit, erasing the memory unit cluster from which data was read, rewriting data in the cluster stored to the buffer unit corresponding to a memory unit address specified by the host system device with data input from the host system device, reading a cluster thus formed in the buffer unit, and storing the read buffer unit cluster to the erased cluster of the memory unit.

8. The data management method according to claim 5, wherein a capacity of the buffer unit is equivalent to one cluster of the memory unit.

\* \* \* \* \*